United States Patent Office

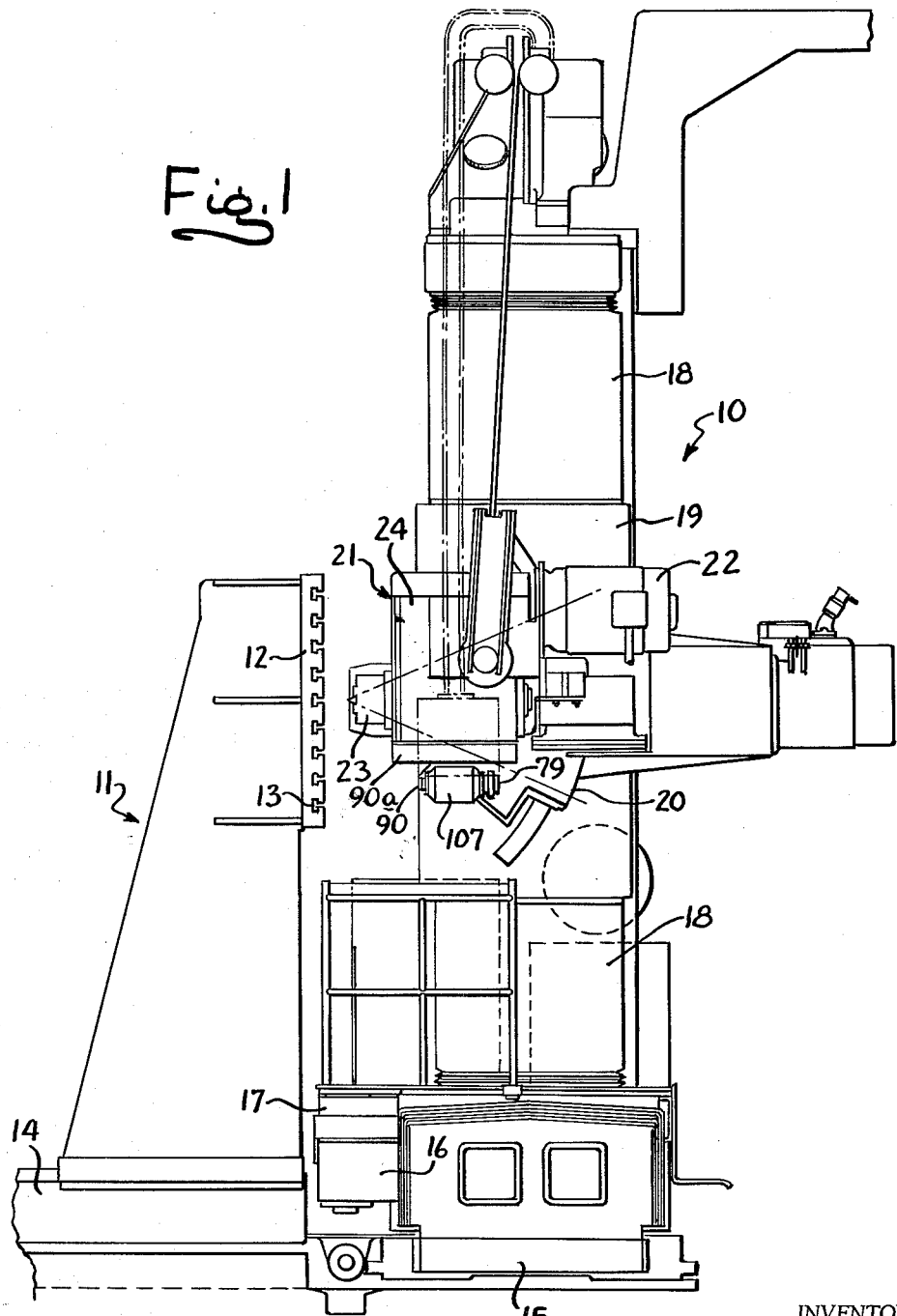

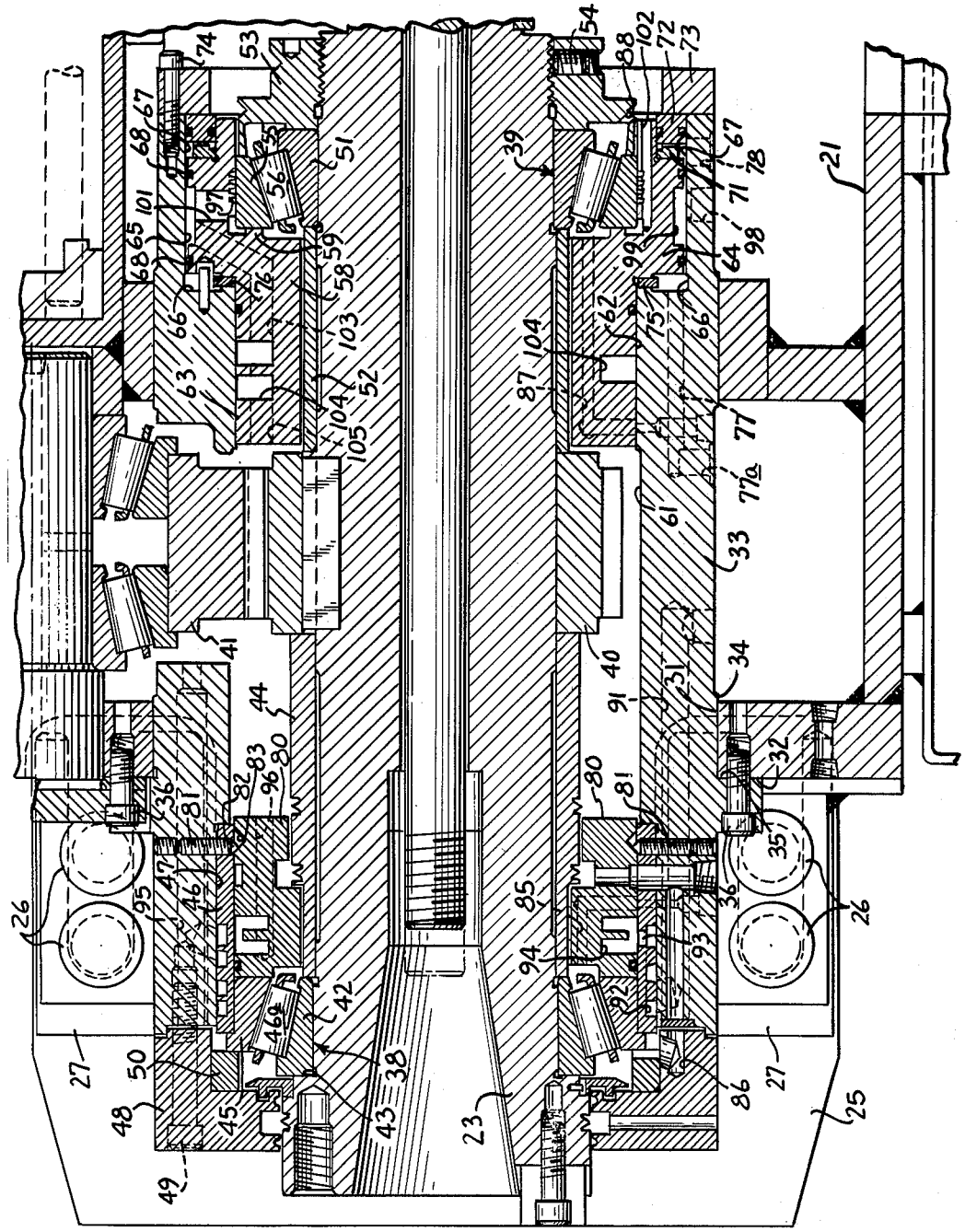

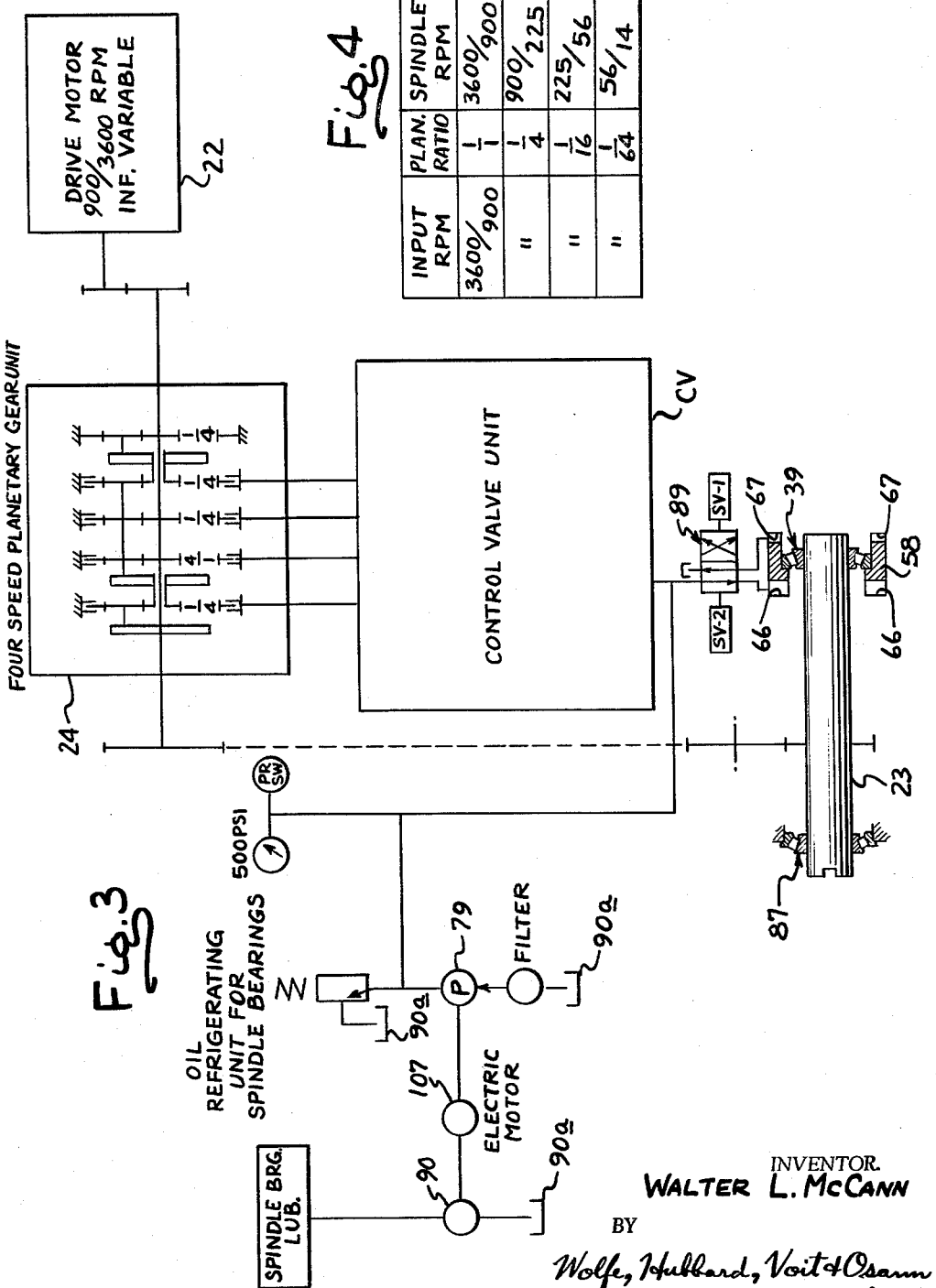

3,211,060
Patented Oct. 12, 1965

3,211,060
SPINDLE BEARING PRELOAD ASSEMBLY
Walter L. McCann, Fond du Lac, Wis., assignor to Giddings & Lewis Machine Tool Company, Fond du Lac, Wis., a corporation of Wisconsin
Filed Dec. 11, 1963, Ser. No. 329,814
10 Claims. (Cl. 90—11)

The present invention relates generally to machine tools and more particularly concerns mechanism for variably preloading the bearings journalling machine tool spindles.

Machine tools such as milling machines, lathes and the like typically utilize a driven spindle for rotating a tool which performs a cutting operation on a work piece. Since these machine tools are usually designed to do many types of work, it is customary to provide a wide range of operating speeds for the spindle. In the past, these spindles have usually been mounted in antifriction bearings having a fixed preload to reduce the vibration and chatter of the rotating spindle. This fixed preload has commonly been a compromise setting suited to meet average machine tool operating conditions. However, such a compromise preload setting causes the generation of heat which adversely affects the bearing alignment and fit when the spindle is operated at high speeds. Conversely, such a compromise preload may not provide sufficient support for the spindle when heavy cuts are made at relatively low speeds and, under this condition, chatter may develop in the tool.

Attempts have also been made in the past to provide a variable preload mechanism for the spindle bearings which allows adjustment of the preload to suit operating conditions. One example of such a variable preload arrangement has been to regulate the hydraulic pressure supplied to a ram operating against a shifting portion of the spindle bearings to alter the amount of preload in accordance with changes in the spindle speed. A somewhat similar arrangement has been to apply the preload to the bearings by means of spring devices that may be externally loaded to a variable degree in accordance with the changes in spindle operating speed. In both of these types of preloading arrangements, however, considerable difficulty has been experienced in setting and maintaining the amount of preload on the bearings due to complicated metering devices which are necessary for the hydraulic systems and due to the thermal expansion of the various components in the spring loaded systems. As a result, these previous variable preload mechanisms have attained only a limited degree of success and have not been widely accepted.

Accordingly, it is the primary aim of the present invention to provide an improved variable bearing preload arrangement for a machine tool spindle whereby a light preload may be maintained on the spindle bearings during high speed operation so that heat generated due to friction is kept to a minimum and to afford a higher preload on the spindle bearings for low speed spindle operation in order to prevent tool chatter.

A more particular object is to provide a variable high-low preload mechanism which is simple and accurate in operation and easy to service and maintain. A further object is to provide a hydraulically actuated variable preload device in which the amount of preload is determined by positive means and is thus not dependent upon the amount of hydraulic pressure employed to shift from high to low preloading.

A related object is to provide such a hydraulically actuated variable preload device which affords positive high-low preload adjustments in either direction.

Yet another object is to provide an improved cartridge-type spindle mounting which includes a variable high-low preload arrangement of the above type. It is a further object to provide such a cartridge-type spindle mounting in which a cooling medium is circulated to dissipate the heat generated by the preloaded spindle bearings.

Other objects and advantages of the invention will become more readily apparent upon reading the following detailed description and upon reference to the drawings in which:

FIGURE 1 is a side elevation of a typical machine tool embodying the present invention;

FIG. 2 is an enlarged partial vertical section taken through the spindle in FIG. 1 to illustrate in more detail the features of the present invention;

FIG. 3 is a diagrammatic control circuit for the preload assembly; and

FIG. 4 is a block diagram illustrating the actuation of the preload control valve at different spindle speed ranges.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown in FIGURE 1 an exemplary high speed floor type milling machine 10 which embodies the novel spindle mounting of the present invention. As illustrated, the machine 10 is adapted to work on a piece (not shown) secured to a relatively heavy work support 11. The work support 11 has an upstanding wall 12 which includes a series of substantially parallel T-slots 13 on its front face for locating the work piece. The support 11 is mounted on a bed 14 for reciprocal movement toward and away from the machine tool 10.

Turning now to the machine tool 10, in the present instance the tool includes a relatively long fixed base 15 which may be secured to the floor or foundation in any suitable manner. The fixed base 15 carries on its top side a sliding base 16 which is adapted to be moved longitudinally on a runway defined by the fixed base. The sliding base 16, in turn, supports a swivel base 17 which in conjunction with certain supporting and guiding elements interposed between the sliding base and the swivel base is adapted to be shifted in an arcuate path along the top surface of the sliding base.

Rigidly fixed to the top of the swivel base 17 and projecting upwardly therefrom is a column 18. The column 18 serves as a support for a vertical saddle 19 which is mounted for sliding movement on the column. The vertical saddle 19, in turn, carries a swivel saddle 20 which cooperates with supporting and guiding elements interposed between the vertical saddle 19 and the swivel saddle 20 to permit arcuate movement of the latter in a vertical plane.

Mounted on the swivel saddle 20 is a headstock 21 supporting an electric motor 22 and a spindle 23 coupled to the motor through a planetary gear reduction unit 24 with a plurality of input to output ratios such as 1:1; 4:1; 16:1 and 64:1. The motor 22, in this case, is desirably water-cooled and may have a rating on the order of 20–50 horsepower with speeds infinitely variable between 900–3600 r.p.m. for example. It will also be understod that the spindle 23 drivingly supports a suitable milling cutter (not shown) which may be of any form appropriate to the work being machined.

From the above, it will be seen that the machine tool 10 is a multiple axis type contour milling machine in which the spindle 23 is adapted to be located in a plurality of different orientations for working upon the work piece secured to the support 11. Furthermore, the variable speed motor 22 and the planetary gear unit 24, in the preferred embodiment, provide operating speeds ranging from 14–3600 r.p.m. for the spindle 23 depending upon the type of material being cut and the depth of cut to be employed.

As is shown in more detail in FIG. 2, the headstock assembly 21 is mounted to a slide 25 on the swivel saddle 20 by means of a plurality of hold-down screws 26. For properly aligning the headstock 21 on the slide 25 one or more shims 27 may be suitably interposed on the face of the slide. Preferably, the headstock 21 is provided with a machined bore 31 and a machined outer surface 32 transverse to the axis of the bore 31. In the present instance, a spindle cartridge housing 33 is inserted within the bore 31 with a machined cylindrical surface 34 and a radial abutting surface 35 adapted to mate with the respective surfaces 31 and 32 of the headstock 21 for supporting and alignment purposes. A plurality of cap screws 36 serve to retain the spindle cartridge 33 in the bore 31 of the headstock 21.

For journalling the spindle 23, the cartridge assembly 33 includes front and rear antifriction bearings 38 and 39, respectively. To drive the spindle a bull gear 40 is suitably secured to the spindle so as to mesh with an idler gear 41 at the output side of the multiple speed gear unit 24. As previously mentioned, the gear unit 24 together with the variable speed motor 22 provides operating speeds for the spindle which preferably range from 14 to 3600 r.p.m.

One important advantage of the cartridge type spindle mounting of the present invention is that all of the components in the cartridge assembly 33 including the spindle 23 and its bearings 38 and 39 are adapted to be preassembled and adjusted in the cartridge prior to inserting the cartridge into the headstock 21. Thus, accurate adjustment and alignment of the spindle support bearings 38 and 39 can be made before the cartridge assembly is installed in the headstock. In this way, the final assembly time of the machine tool 10 may be substantially reduced. Furthermore, this arrangement affords a high degree of accuracy for the spindle mounting since the seats for the bearings 38 and 39 may be independently machined and since the cartridge 33 is retained on mating machined surfaces in the headstock 21.

The front and rear bearings 38, 39, as shown in FIG. 2, are preferably of the tapered roller bearing type adapted to resist both radial and axial loads on the spindle 23. The front bearing 38 includes a conical inner race 42 mounted on the spindle 23 against an abutting shoulder 43. An elongated sleeve 44 which abuts the bull gear 40 and surrounds the spindle 23 serves to maintain the inner race 42 against the shoulder 43. An outer race 45, also generally conical in shape, serves to locate a plurality of tapered rollers 46a in the front bearing 38. The outer race 45 is mounted in a heat exchanging sleeve 46 which is inserted in an axial bore 47 defined in the forward end of the spindle cartridge housing 33. A clamp ring 48 secured to the housing 33 by a plurality of cap screws 49 draws a spacer ring 50 against a flange 45a of the outer race 45 to hold the outer race and the heat exchanging sleeve 46 within the bore 47.

The rear bearing 39, similar to the front bearing, includes a conical inner race 51 mounted on the spindle 23 and is retained in position by means of a sleeve-like spacer 52 which abuts the bull gear 40 and a threaded nut 53 locked to the spindle 23 by means such as a set screw 54. A conical outer race 55 serves to locate a plurality of tapered rollers 56 in the rear bearing 39.

In accordance with the present invention, means are provided for variably preloading the bearings 38, 39 which journal the spindle 23 to prevent vibration and chatter as the tool engages the work piece. For this purpose a stepped annular collar 58 surrounds the spacer 52 and carries a shoulder 59 adapted to abut the outer race 55 of the rear bearing 39. Due to the conical configuration of the outer race 55, it will be apparent that axial movement of the stepped collar 58 to the right, as seen in FIG. 2, will act to increase the preload on the bearing 39. At the same time, the tendency for the spindle 23 to move to the right, increases the preload on the front bearing 38. On the other hand, movement of the collar 58 in the opposite direction will decrease the preload on the bearings 38, 39.

In the illustrated embodiment, the annular collar 58 is mounted for axial movement in a stepped bore 61 defined in the spindle cartridge housing 33. The smaller or stepped-down portion of the collar 58 is preferably provided with a machined outer surface 62 slidably mounted in a similarly machined portion 63 of the stepped bore. The enlarged end of the stepped collar 58 defines a hydraulic piston 64 slidably mounted in an enlarged cylinder portion 65 of the stepped bore.

For moving the collar 58 to alternately increase or decrease the preload on the rear bearing 39, the cylinder 65 defines a pair of pressure chambers 66 and 67, respectively, at opposite ends of the piston 64. When pressure chamber 66 is supplied with a pressure medium, such as hydraulic fluid, the piston 64 is urged to the right as seen in FIG. 2 causing the shoulder 59 to increase the preload on the rear bearing 39, and through the spindle 23 to increase the preload on the front bearing 38. Conversely, when the pressure in the chamber 67 is increased, the piston 64 and stepped collar 58 shift to the left decreasing the preload on the bearings 38, 39. In order to maintain a good fluid seal between the piston 64 and the respective pressure chambers 66 and 67, each end of the piston defines an annular groove which carries an O-ring seal 68.

In further accordance with the present invention, both the maximum and minimum preloads on the bearings 38, 39 can be accurately selected. To this end, positive stop means are provided for limiting the axial movement of the annular collar 58 in either direction. To establish the maximum preload on the bearings 38, 39, an accurately machined spacer ring 71 is mounted in the right-hand end of the cylinder 65, as shown in FIG. 2. The annular spacer 71 is located by a seal ring 72 secured in the cylinder 65 by means of an annular clamp ring 73 secured to the cartridge housing 33 by a plurality of cap screws 74. Thus, when pressure fluid is admitted to the chamber 66 at the left-hand end of the piston 64, movement of the piston to the right in FIG. 2 is limited by the spacer 71 thereby establishing the maximum preload on the spindle bearings 38, 39.

To establish the minimum preload on the spindle bearings, a similarly machined spacer 75 is mounted against a shoulder 76 in the cylinder 65 at the left-hand end of the piston 64. Thus, when pressure fluid is admitted to the chamber 67 causing the piston to shift to the left as seen in FIG. 2, the piston strikes the spacer 75 to establish the minimum preload on the bearings 38, 39. Since the spacers 71 and 75 respectively establish the maximum and minimum amounts of preload on the spindle bearings, the amount of fluid pressure applied to opposite ends of the piston 64 can be sufficiently great to insure the desired motion of the piston. In this connection it will be understood that sufficient fluid pressure is applied to the piston 64 in order to obtain metal-to-metal contact between the piston and one of the spacers 71, 75 abutting against the cartridge housing 33. Desirably, the actual amount of piston movement may be very small, for example, on the order of about 10 thousandths of an inch.

It will be appreciated that the preload exerted on the rear bearing 39 acts through the outer race 55, the rollers 56 and the inner race 51 to urge the end collar 53 and spindle 23 to the right as seen in FIG. 2. Any tendency for the spindle 23 to move to the right, of course, causes the shoulder 43 on the spindle to similarly move the inner race 42 of the front bearing 38 along with it, since the outer race 45 of the front bearing is held in position by the heat exchanging sleeve 46. Accordingly, when the piston 64 for preloading the rear bearing 39 is shifted between the two positive stops 71 and 75, this also tends to correspondingly alter the preload condition on the front bearing 38.

In an exemplary machine of the type here illustrated in which the variable speed motor 22 and gear unit 24 provide spindle operating speeds in the range of 14–3400 r.p.m. it has been found that a high preload in the nature of 35 inch pounds torque on the spindle bearings 38, 39 is desirable for the lower spindle speeds, for example, between 14–900 r.p.m. As previously indicated, the high preload setting is established by grinding the spacer 71 so that the maximum desired amount of preload is obtained when the piston 64 is forced against this spacer. A minimum preload of about 10 inch pounds torque or bearing drag has also been found to be desirable when the spindle 23 is operated in its high range of speed, for example between 900–3600 r.p.m. This amount of preload is, of course, established by grinding the spacer 75 so that the bearings 38, 39 provide the desired bearing drag when the piston 64 is shifted against this spacer.

To admit pressure fluid to the high preload pressure chamber 66, the cartridge housing 33 defines a suitable fluid passage 77 which communicates with the chamber 66 and a tapped opening 77a. Similary, for admitting pressure fluid to the low preload pressure chamber 67, the cartridge housing is provided with a suitably tapped opening 78 communicating with the chamber 67. The openings 77a, 78 are fitted with suitable fluid conduits for alternatively delivering fluid under pressure from a motor driven pump 79 (see FIG. 1) to the chambers 66, 67.

To control the selective admission of pressure fluid to the chambers 66, 67, the exemplary machine 10 is provided with an automatic valving arrangement diagrammatically illustrated in FIG. 3. As shown here, the variable speed motor 22 drives the spindle 23 through the multiple speed gear unit 24. In the present instance, the gear unit 24 is preferably a four-speed planetary transmission of the type disclosed in the copending McCann et al. application, Serial No. 232,339, filed October 17, 1962, and assigned to the same assignee as the present invention. The output speed of the gear unit is thus dependent upon the input from the variable speed motor 22 and upon the actuation of suitable internal gears by a control valve unit CV to give output ratios such as 1:1; 1:¼; 1:¹⁄₁₆ and 1:¹⁄₆₄, for example.

As shown in the table of FIG. 4, selection of the 1:1 planetary gear ratio provides a high speed spindle operating range of 900–3600 r.p.m. All spindle speeds less than 900 r.p.m. may be considered as low speeds in terms of the present invention. In other words the three planetary gear reducing rations of 1:¼, 1:¹⁄₁₆ and 1:¹⁄₆₄ define the low speed spindle operating ranges of 225–900 r.p.m., 56–225 r.p.m. and 14–56 r.p.m., respectively.

In the preferred embodiment, selection of the high speed spindle operating range (900–3600 r.p.m.) automatically initiates pressurization of chamber 67 to achieve the minimum preload on the spindle bearings 38, 39. Conversely, selection of any of the three low speed spindle operating ranges initiates pressurization of chamber 66 to establish the maximum bearing preload. As shown in FIG. 3, the chambers 66, 67 are selectively pressurized by suitable actuation of a four-way control valve 89 in the supply line from the pump 79. To actuate the control valve 89, a pair of solenoids SV-1 and SV-2 are energized in accordance with the table of FIG. 4 to automatically establish the desired high and low preloads upon selection of the spindle operating speeds.

Pursuant to another aspect of the present invention, means are provided within the spindle cartridge housing 33 for lubricating both the front and rear bearings 38, 39 and for circulating a refrigerated coolant in order to diminish the heat build-up due to the friction of the bearings. In the illustrative embodiment, a heat exchanging collar 80 surrounds the spindle 23 and abuts the outer race 45 of the front bearing 38. The collar 80 is retained in place by a plurality of set screws 81 received in threaded openings in the cartridge housing 33. Each of the set screws 81, in the present instance, is formed with a conical point 82 adapted to contact a V-shaped notch 83 to maintain the collar 80 against the outer race 45 of the front bearing 38.

As shown in FIG. 2, the rollers 46a of the front bearing 38 are lubricated with oil forced through a passage 85 which extends through the spindle cartridge housing 33, through the sleeve 46, and the collar 80 to the front bearing 38. A return passage 86 defined in the housing 33 and clamp ring 48 exhausts the oil from the front bearing. The rear bearing 39, similarly, is lubricated through a passage 87 extending through the housing 33 and the collar 58 to the rear bearing. In this case oil is exhausted from the rear bearing through a small opening 88 in the end collar 53 and flows into the cartridge housing 33. Lubricating oil is supplied to the passages 85, 87 by a suitable motor driven pump 90 and the return oil is collected in a sump or reservoir 90a on the lower portion of the headstock assembly 21 (see FIG. 1).

To cool the front bearing 38 the heat exchanging sleeve 46 is supplied with refrigerated cooling fluid through an enlarged passage 91 formed in the spindle housing 33. From the passage 91 the refrigerated fluid is directed to a plurality of annular grooves 92 formed in the outer periphery of the heat exchanging sleeve 46. An aperture 93 formed in the sleeve 46 also communicates the refrigerated fluid to a pair of annular recesses 94 formed in the heat exchanging collar 80. By lubricating the bearing 38 and cooling the heat exchanging collar 80 and sleeve 46 in this manner, it is possible to reduce the heat generated from the bearings to a minimum. A portion of the refrigerated fluid in the grooves 92 of the heat exchanging sleeve 46 is exhausted through a passage 95 in the upper portion of the spindle cartridge housing 33 and dumps into the housing. Similarly, the portion of the fluid in recesses 94 of the heat exchanging collar 80 is picked up through a passage 96 formed axially in the collar so as to exhaust into the housing 33 above the spindle 23. The exhausted fluid then flows into the sump 90a.

The rear bearing 39 is also desirably cooled with refrigerated fluid which is circulated around the bearing 38 and the piston 64. For this purpose the inner portion of the piston 64 is desirably formed with a plurality of heat exchanging grooves 97. These grooves are supplied with refrigerated fluid through an opening 98 in the housing 33 into an annular reduced portion 99 of the piston 64 and thence through an aperture 101 at the upper side of the piston into the grooves. An exhaust aperture 102 in the lower portion of the piston 64 drains a portion of the refrigerant out through the end of the piston into the housing 33. A portion of the refrigerated fluid in the annular recess 99 is also communicated through a passage 103 defined in the upper portion of the collar 58 to a spiral peripheral groove 104 in the surface 62 of the collar. An exhaust passage 105 drains the fluid into the housing 33 and the exhausted fluid then passes into the sump 90a.

For pressurizing the refrigerated fluid, the pump 79 is driven by a motor 107 suspended from the headstock 21 (see FIG. 1). The pump and motor are, therefore, movable with the headstock as the spindle is selectively positioned with respect to a work piece. The motor 107 also drives the lubricant pump 90 which is mounted at the end of the motor. It will also be understood that suitable conduits (not shown) are provided to carry the refrigerated fluid from the pump 79 to the passages 91 and 98 for cooling the bearings 38, 39.

From the above it will be seen that the spindle cartridge housing 33 provides a simple and easily assembled unit for journalling the spindle 23 and accurately aligning the spindle in the headstock 21 of the machine tool 10. Furthermore, the novel variable bearing preload arrangement with positive stops 71, 75 within the housing 33 accurately establishes both the high and low preload settings free from variations in the hydraulic pressure alternately supplied to the chambers 66, 67. In addition, the heat generated due to bearing friction is largely dissipated by circulating refrigerated fluid through annular grooves defined in the novel heat exchanging collars supporting the bearings. Accordingly, the variable preload bearing arrangement of the present invention provides positive, troublefree operation with adequate bearing support and cooling throughout a wide range of spindle operating speeds.

I claim as my invention:

1. In a machine tool having a support column with a headstock defining an internal bore adjustably mounted on said column, the combination comprising a spindle cartridge assembly mounted in said bore, a drive motor mounted on said headstock, a multiple gear drive unit having a plurality of input-output ratios interposed between said motor and said spindle cartridge assembly, a rotatable spindle journalled in said cartridge assembly with a bull gear mounted thereon in driving relation with said multiple gear drive unit, said spindle being journalled by front and rear antifriction bearings each having an inner race secured to said spindle for rotation therewith and an outer race supported by said cartridge assembly with a plurality of roller elements interposed between said inner and outer races, said cartridge assembly also defining a cylinder portion adjacent said rear bearing and having an axially slidable annular piston disposed therein, said piston having a shoulder disposed in contact with said outer race to vary the preload on said rear bearing in response to axial movements of said piston, a pair of annular pressure chambers located within said cylinder at opposite ends of said piston, means for alternatively admitting pressure fluid to one or the other of said chambers in response to a predetermined selection of said input-output ratios of said multiple gear drive unit, and means for limiting the axial movement of said piston in each direction upon the admission of pressure fluid to said respective chambers in order to establish the minimum and maximum preloads on said rear bearing.

2. In a machine tool having a support column with a headstock defining an internal bore adjustably mounted on said column, the combination comprising a spindle cartridge assembly mounted in said bore, a drive motor mounted on said headstock with a multiple gear drive unit interposed between said motor and said spindle cartridge assembly, a rotatable spindle journalled in said cartridge assembly with a bull gear mounted thereon in driving relation with said multiple gear drive unit, said spindle being journalled by front and rear antifriction bearings each having an inner race secured to said spindle for rotation therewith and an outer race supported by said cartridge assembly with a plurality of roller elements interposed between said inner and outer races, said cartridge assembly also defining a cylinder portion adjacent one of said bearings and having an axially slidable annular piston disposed therein, said piston having a shoulder disposed in contact with said outer race to vary the preload on said one bearing in response to axial movements of said piston, means including a pair of annular pressure chambers located within said cylinder at opposite ends of said piston whereby said piston is selectively movable in opposite directions upon the admission of pressure fluid to said respective chambers, and means for limiting the axial movement of said piston in each direction in order to establish the minimum and maximum preloads on said front and rear bearings.

3. A bearing support mounting for a rotatable spindle comprising, in combination, a spindle cartridge housing, a pair of front and rear antifriction bearings journalling said spindle within said housing, each of said bearings having an inner race secured to said spindle for rotation therewith and a nonrotatable outer race with a plurality of roller elements interposed between said inner and outer races, said outer race of said front bearing being restrained against axial movement within said housing, said housing also defining an annular cylinder portion adjacent said rear bearing, an axially slidable piston disposed in said cylinder portion in contact with said outer race of said rear bearing to vary the preload on said rear bearing in response to axial movements of said piston, said preload on said rear bearing being transmitted through said spindle and said inner races to simultaneously vary the preload on said front bearing, a pressure chamber located within said cylinder adjacent each end of said piston whereby a pressure differential in said chambers is effective to selectively move said piston in opposite directions, and positive stop means interposed between said housing and each end of said piston to limit the axial movement of said piston in each direction so as to establish the minimum and maximum preloads on said bearings.

4. A bearing support mounting for a rotatable spindle comprising, in combination, a spindle cartridge housing, a pair of front and rear antifriction roller bearings journalling said spindle within said housing, each of said bearings having a conical inner race secured to said spindle for rotation therewith and a nonrotatable conical outer race with a plurality of roller elements interposed between said inner and outer races, said conical inner races having oppositely inclined roller surfaces, said outer race of said front bearing being restrained against axial movement within said housing, said housing also defining an annular cylinder portion adjacent said rear bearing, an axially slidable piston disposed in said cylinder portion in contact with said outer race of said rear bearing to vary the preload on said rear bearing in response to axial movements of said piston, said preload on said rear bearing being transmitted through said spindle and said inner races to simultaneously vary the preload on said front bearing, a pressure chamber located within said cylinder adjacent each end of said piston whereby a pressure differential in said chambers is effective to selectively move said piston in opposite directions, and positive stop means interposed between said housing and each end of said piston to limit the axial movement of said piston in each direction so as to establish the minimum and maximum preloads on said bearings.

5. A spindle cartridge assembly for a machine tool having a headstock formed with an internal bore comprising, in combination, a spindle cartridge housing insertable within said bore, a rotatable spindle journalled in said cartridge housing in a pair of front and rear antifriction bearings each having an inner race and an outer race with a plurality of roller elements interposed therebetween, a multiple gear unit having a plurality of selective output speed ranges for driving said spindle, said cartridge housing also defining a cylinder portion adjacent one of said bearings with an axially slidable piston mounted therein, a fluid pressure chamber located within said cylinder adjacent each end of said piston for moving said piston in opposite directions in response to a relative pressure differential between said fluid pressure chambers, said piston having a portion thereof disposed in contact with said outer race and said one bearing to vary the preload on said bearings in response to axial movements of said piston, means for alternately communicating pressure fluid to said pressure chambers in response to the predetermined selection of each of said output speed ranges for driving said spindle, and means for limiting the axial movement of said piston whereby the minimum and maximum preloads on said bearings are positively established.

6. A bearing support mounting for a rotatable spindle comprising, in combination, a spindle housing, a pair of front and rear antifriction bearing journalling said spindle within said housing, each of said bearings having an inner race secured to said spindle for rotation therewith and a nonrotatable outer race with a plurality of roller elements interposed therebetween, said housing also defining an annular cylinder portion adjacent said rear bearing, an axially slidable piston disposed in said cylinder portion in contact with said outer race of said rear bearing to vary the preload on said rear bearing in response to axial movements of said piston, a pressure chamber located within said cylinder adjacent each end of said piston whereby a pressure differential in said chambers is effective to selectively move said piston in opposite directions, and a positive stop interposed between said cartridge housing and each end of said piston to limit the axial movement of said piston in each direction so as to establish the minimum and maximum preloads on said rear bearing.

7. A bearing support mounting for a rotatable spindle comprising, in combination, a spindle cartridge housing, a pair of front and rear antifriction bearings journalling said spindle within said housing, each of said bearings having an inner race secured to said spindle for rotation therewith and a nonrotatable outer race with a plurality of roller elements interposed therebetween, said housing also defining an annular cylinder portion adjacent said rear bearing, an axially slidable piston disposed in said cylinder portion in contact with said outer race of said rear bearing to vary the preload on said rear bearing in response to axial movements of said piston, a pressure chamber located within said cylinder adjacent each end of said piston whereby a pressure differential in said chambers is effective to selectively move said piston in opposite directions, positive stop means interposed between said cartridge housing and each end of said piston to limit the axial movement of said piston in each direction so as to establish the minimum and maximum preloads on said rear bearing, said piston formed with a plurality of internal annular grooves surrounding the outer circumference of said outer race, and means for communicating a cooling medium to said annular grooves for dissipating the heat generated by said preloaded rear bearing.

8. A spindle mounting for a machine tool comprising, in combination, a spindle cartridge housing for rotatably supporting a spindle on a pair of front and rear antifriction bearings each having an inner race secured to said spindle for rotation therewith and an outer race with a plurality of roller elements interposed therebetween, an annular collar surrounding said spindle adjacent said front bearing so as to abut said outer race of said front bearing, an annular piston surrounding said spindle adjacent said rear bearing with a portion thereof abutting said outer race of said rear bearing, first respective passages defined in each of said collar and said piston for admitting lubricating fluid to the roller elements of said respective front and rear bearings, each of said collar and piston elements also defining a plurality of annular grooves therein, and second respective passages defined in each of said collar and said piston for admitting a cooling medium to said respective annular grooves in order to dissipate the heat generated by the front and rear bearings.

9. A spindle mounting for a machine tool comprising, in combination, a spindle cartridge housing for rotatably supporting a spindle on a pair of front and rear antifriction bearings, said rear bearing having an outer race axially movable to preload said bearing, means including a piston axially shiftable against said outer race between a pair of fixed stops to establish the minimum and maximum preloads on said rear bearing, a pair of pressure chambers located within said housing adjacent opposite ends of said piston for shifting said piston in response to a pressure differential in said chambers, said front bearing having an outer race mounted in a heat exchanging sleeve disposed in said housing, said heat exchanging sleeve and said piston each having a plurality of annular grooves formed therein, and means for conducting a cooling medium to said annular grooves in order to dissipate the heat generated by said respective front and rear bearings.

10. A bearing mounting for a rotatable spindle comprising, in combination, a spindle cartridge housing, a pair of front and rear antifriction bearings in said housing for journalling said spindle, each of said bearings having an inner race secured to said spindle for rotation therewith, and an outer nonrotatable race with a plurality of roller elements interposed therebetween, means interposed between each of said outer races and said cartridge housing for retaining said respective outer races, each of said retaining means having a plurality of annular grooves formed therein, and means for admitting a cooling medium to said annular grooves in order to dissipate the heat generated by said bearings.

No references cited.

WILLIAM W. DYER, JR., *Primary Examiner.*